United States Patent
Martin

[15] 3,689,038
[45] Sept. 5, 1972

[54] DYNAMIC GAS FLOW APPARATUS
[72] Inventor: Aaron J. Martin, Kennett Square, Pa.
[73] Assignee: Marlabs, Inc.
[22] Filed: April 13, 1971
[21] Appl. No.: 133,669

Related U.S. Application Data

[62] Division of Ser. No. 855,641, Sept. 5, 1969, Pat. No. 3,618,911.

[52] U.S. Cl. ...................263/2, 55/158, 137/592, 285/338
[51] Int. Cl. .................................................F27b 3/00
[58] Field of Search.........73/1 R; 137/604, 588, 590, 137/592; 55/15, 158, 261, 385; 263/2; 285/196, 162, 338, 346

[56] References Cited

UNITED STATES PATENTS

| | | |
|---|---|---|
| 2,255,069 | 9/1941 | Maier............................55/16 |
| 3,209,579 | 10/1965 | Roberts........................73/1 R |
| 3,415,038 | 12/1968 | Merten et al...................55/16 |
| 3,521,865 | 7/1970 | Kertzman......................73/1 R |
| 3,533,272 | 10/1970 | Dahms.........................73/1 R |
| 3,589,171 | 6/1971 | Haley............................55/16 |

*Primary Examiner*—Bernard Nozick
*Attorney*—Mortenson & Weigel

[57] ABSTRACT

Various gas mixing apparatus including permeation tubes, diffusion tubes, and permeation wafers and their associated housing are adapted to be housed in an oven. The oven has a cover in which are mounted a pair of annularly disposed sleeves, one being flanged, to retain a sealing O-ring. The sleeves are adapted to fit within a mixing tube in which the permeation or diffusion tubes are positioned. The two sleeves can be counter rotated to compress the O-ring and effect a seal with the inner wall of the mixing tubes. This renders the mixing tube easy to remove and replace.

4 Claims, 7 Drawing Figures

PATENTED SEP 5 1972 3,689,038
SHEET 1 OF 2
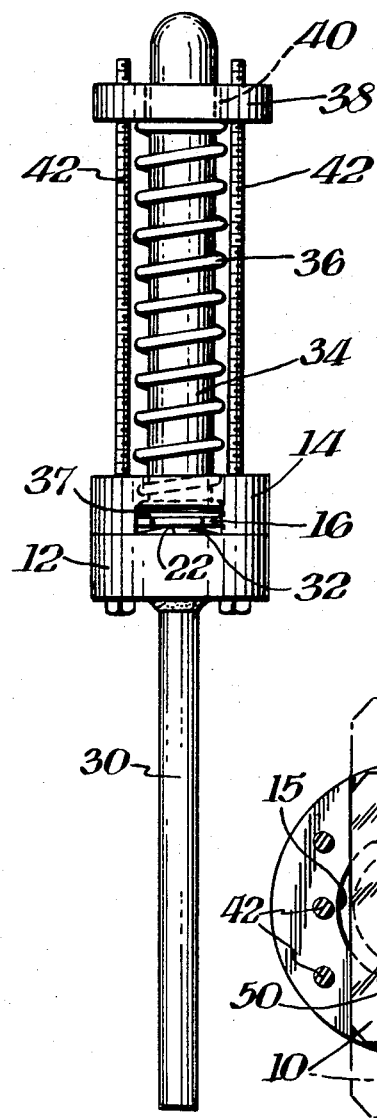
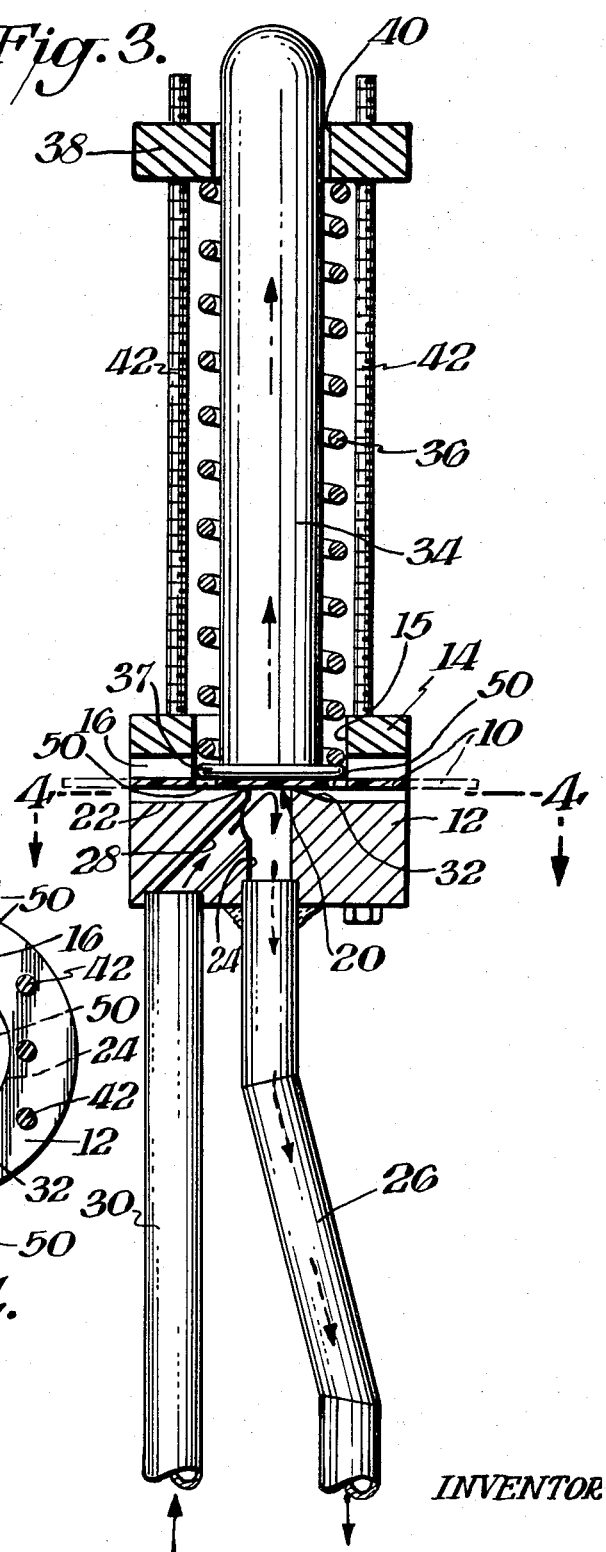
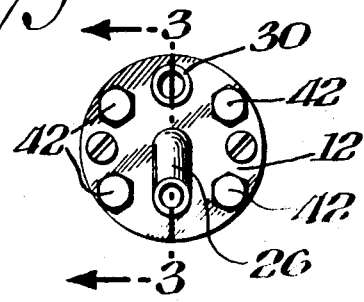
INVENTOR
Aaron J. Martin
BY Mortenson and Weigel
ATTORNEYS

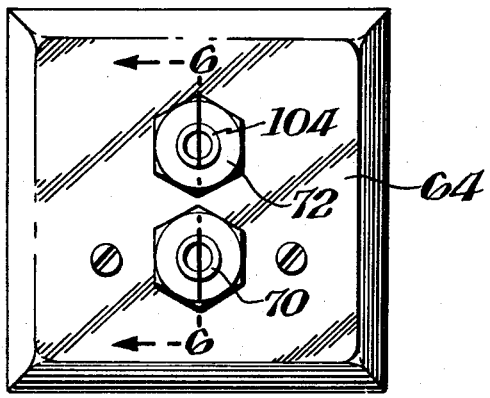
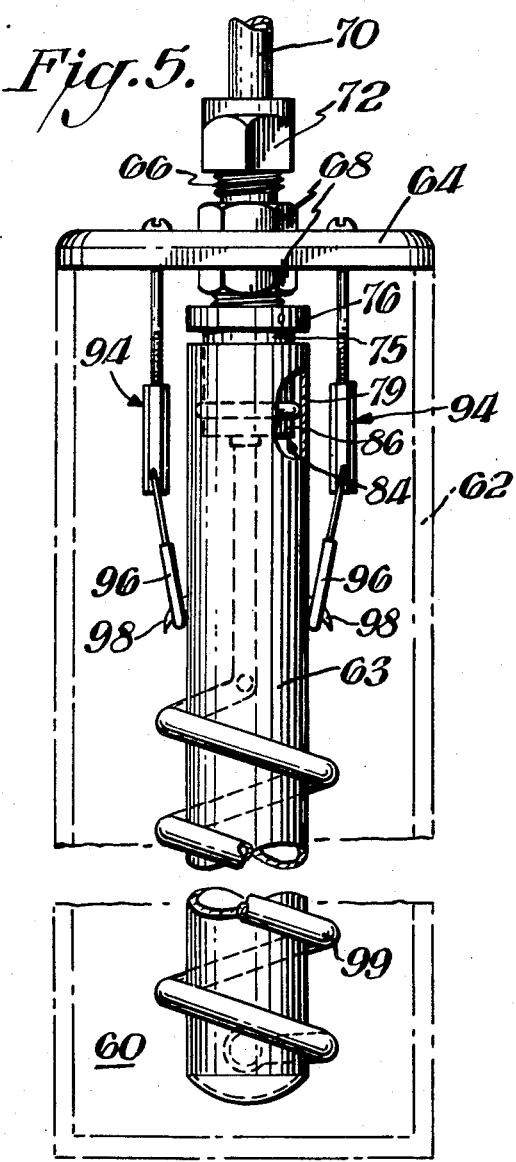
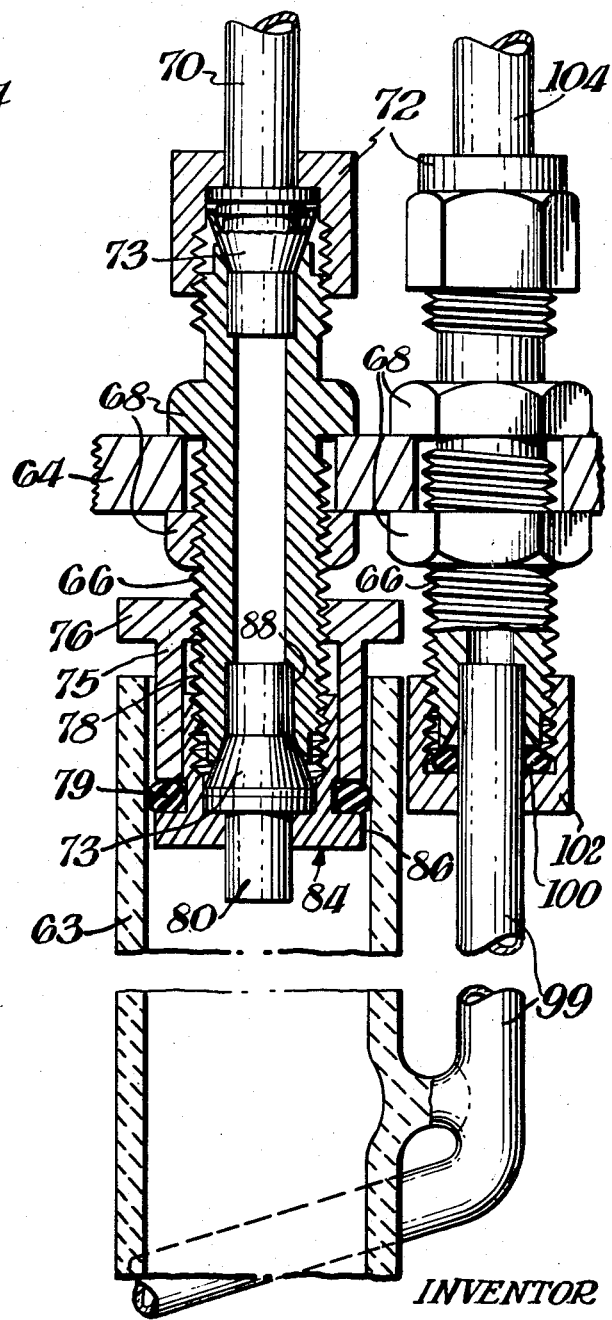
INVENTOR
Aaron J. Martin
BY
Mortenson and Weigel
ATTORNEYS

DYNAMIC GAS FLOW APPARATUS

BACKGROUND OF THE INVENTION

This is a division of patent application Ser. No. 855,641, filed Sept. 5, 1969 entitled Dynamic Gas Mixing Apparatus now U.S. Pat. No. 3,618,911.

It is often desirable in research laboratories and elsewhere to provide a flowing gas and/or vapor mixture wherein one component of the mixture constitutes a relatively low but controlled part of the mixture, i.e., the one component is at a low concentration in the mixture. Flowing gas mixtures whose component are of known concentrations in the mixture are useful, for example, in air pollution studies, toxicological studies, and other areas requiring a dynamic gas system. In a typical case one may wish to provide a flowing air stream having a known concentration of a pollutant.

It is relatively difficult to prepare a gas mixture having a very low concentration component because of the great difficulty of accurately measuring the low level (concentration) component. Furthermore, often upon storage the concentration of the low level component may be reduced or changed by sorption or reaction with the container in which it is stored, the valve packings of the container, impurities in the container, or by diffusion into or out of the container. These difficulties of storing a mixture have been overcome by resort to dynamic systems in which the mixture is a flowing gas stream. In such a flowing stream, any sorption or reaction sites within the flow system are quickly saturated such that after the system has stabilized, the gas flow will have the desired concentration.

Even in the flowing or dynamic systems, however, difficulties are encountered. Theoretically, it is impossible to mix individually metered gases together thereby to form the dynamic stream. Upon departing from theory and entering the field of practice, such metering is often difficult if not impossible. For example, if a flowing stream of gas composed of a mixture of one part of a first component in a million parts of a second component is to have a flow rate of 1 liter per minute, it may be noted that the flow rate of the second component will be approximately 1 liter per minute while that of the first component will be approximately 1 microliter per minute. There is no known metering device capable of handling the lower flow rate. For this reason, resort is had to other techniques. Two such techniques are in use today.

Both of these techniques involve placing a device capable of releasing the low level component of the mixture at a known rate into the flowing stream of the second component. One of these techniques uses a permeation tube and is described in an article entitled "Primary Standards For Trace Gas Analysis" by O'Keefe, A.E., and Ortman, G.C., *Analytical Chemistry* Vol. 38, page 760, 1966. According to O'Keefe et al., a portion of a permeation tube such as fluorinated ethylene propylene resin is exposed to the metered flow of gas. Thus the substance to be dispersed in the flowing gas, which substance is enclosed within the permeation tube, passes through the walls of the permeation tube into the stream of diluting gas. The rate of permeation through the walls of the tube is a known quantity and varies as a function of temperature. Hence, by controlling the temperature, the permeation rate through the walls of the tube is known and a flowing gas mixture of desired concentrations can be obtained simply by metering the large volume flow and controlling the temperature of the permeation tube.

The second technique envisions a diffusion tube within a flowing gas stream. This technique is described by Lugg, C.A., Analytical Chemistry, Vol. 40, page 1,072, 1968. The diffusion technique is particularly useful with vaporizable liquids. The liquid is placed in a vial connected in an open tube of known dimensions (the tube is typically a capillary tube) and the tube's open end exposed to the flow of a metered gas stream. In this manner, the vapor of the low level component can diffuse through the open tube into the flowing stream of the high level component. The rate of diffusion is again temperature dependent in a predictable way.

Both of these techniques using permeation tubes and diffusion tubes in a dynamic system are quite useful and find rather wide spread usage today particularly with the increasing importance of air pollution studies. Unfortunately, however, both are somewhat limited in the lower limit of concentration levels that can be attained. Additionally, both permeation tubes and diffusion tubes require somewhat unwieldy and bulky apparatus for placing them in an oven to thereby control the rate at which the low level components are introduced into the flowing gas stream.

Accordingly, it is an object of this invention to provide an improved dynamic gas mixing apparatus capable of providing gas mixtures having components of relatively low concentration.

Another object of this invention is to provide an improved dynamic gas mixing system in which the oven cavity is capable of use with permeation tubes, diffusion tubes and permeation wafers.

BRIEF DESCRIPTION OF THE INVENTION

A preferred embodiment of the invention is an oven chamber adapted to house the gas mixing units for permeation and diffusion tubes as well as permeation wafers. For this purpose, a pair of annularly disposed sleeves, one being flanged, to house an O-ring, are adapted to fit within a mixing tube in which the permeation or diffusion tubes or wafers are placed. When the two annularly disposed sleeves are counter-rotated with respect to each other, the O-ring is compressed and caused to enlarge to contact the inner wall of the mixing tube and thereby provide a chamber having a seal at one end. With either a diffusion tube or a permeation tube positioned within the mixing tube, the high concentration component of the gas mixture is swept through the mixing tube to provide the desired mixture. The tube itself is adapted to fit within the same oven as that used with the permeation wafer.

BRIEF DESCRIPTION OF THE DRAWINGS

The novel features that are considered characteristic of this invention are set forth with particularity in the appended claims. The invention, itself, however, both as to its organization and method, as well as additional objects and advantages thereof, will best be understood from the following description when read in connection with the accompanying drawings, in which:

FIG. 1 is a side elevation view of a dynamic gas mixing apparatus utilizing a permeation wafer;

FIG. 2 is a bottom plan view of the mixing apparatus illustrated in FIG. 1;

FIG. 3 is a cross-sectional front elevation view of the gas mixing apparatus illustrated in FIG. 1;

FIG. 4 is a top plan view of the mixing apparatus illustrated in FIGS. 1 and 3 taken along the section line 4—4 of FIG. 3;

FIG. 5 is a side elevation view of an assembly adapted to house several types of gas release apparatus such as permeation or diffusion tubes for producing dynamic gas streams in which at least one component is of relatively low concentration;

FIG. 6 is a partial cross-sectional elevation view taken along the section line 6—6 of the apparatus illustrated in FIGS. 5 and 7; and FIG. 7 is a top, end view of the apparatus illustrated in FIG. 5.

DESCRIPTION OF THE PREFERRED EMBODIMENT

There is illustrated in FIGS. 1 through 4 a dynamic gas mixing apparatus of a type described and claimed in patent application Ser. No. 855,641, filed Sept. 5, 1969 by Aaron J. Martin. The said Martin application utilizes a permeation disc or wafer 10 to control the rate at which the lower level component of a gas mixture is added to a stream of gas containing the pure higher level component. The apparatus itself includes a main cylindrical shaped body portion 12 and an adjoining wafer retaining body 14 which is also cylindrical in shape and coaxially adjoins the main body portion 12. The wafer retaining body 14 has a slot or groove 16 cut in one face thereof such that when it is attached to the main body portion 12, the permeable wafer 10, which may be generally rectangular in shape, may be inserted through the slot portion 16. Both the retaining body and the main body may be formed of any suitable material such as stainless steel or an inert plastic.

A port 20 is formed in that face 22 of the main body which adjoins the retaining body 14. This port 20 is formed along the axis of the main body 12 and an axial bore 24 provides an exit gas passage from the main body 12. An outlet tube 26 may be connected to the bore 24 by any suitable means such as silver solder, brazing, etc. In like manner, an angular bore 28 is formed in the main body portion 12 to intersect with the port 20 and to provide a channel through which an inlet tube 30 may be connected to the main body 12. In this manner, gas to be partly diluted may be passed through the inlet tube 30, bore 28 to pass to the port 20 and then exit through the bore 24 and outlet tube 26 as will be described hereinafter.

The wafer 10 is positioned in the slot 16 to cover the port 20. To facilitate sealing the port 20 by the wafer 10, an annular protuberance 32 may be formed in the face 22 of the main body 12. The wafer 10 is held in compressive contact with the annular protuberance 32 by the open end of a lipped vial or receptacle 34. The receptacle 34 may be formed of any suitable material such as glass or the like, and may have an open end or lipped portion 37 which contacts what may be termed the back surface of the wafer 10 such that the wafer 10 separates the contents of the receptacle 34 from the gas stream which is swept across the opposite face of the wafer 10 in the area of the port 20. A compression spring 36 which fits over the receptacle 34 engages the lipped portion 37 and may be adjusted in its compression by a retainer disc 38 having a bore 40 which receives the receptacle 34. Extended screws 42 which pass through suitable bores within the main body 12 and retaining body 14 are threaded into appropriate threaded holes or bores formed within the spring retainer 38. Thus, by adjusting the screws 42, the compression of the spring 36 upon the lip 37 of the receptacle 34 may be varied.

In operation the receptacle 34, filled with a vaporizable fluid or gas which is to be permeated through the wafer, is first placed within the coil spring 36 until the spring contacts its lip 37 and then the closed end of the receptacle 34 inserted into the spring retainer 38. The spring 36 is compressed and the lip 37 allowed to enter into the axial bore 15 in the retaining body to contact the one face of the wafter 10 and to cause the wafer to be in compressive contact with the annular protuberance 32 forming the port 20. In this manner, gas or fluid contained within the receptacle 34 is allowed to permeate through the wafer 10 at a known rate, which rate is a function of temperature, and enter the large volume of gas flowing through the inlet tube 30 across the remaining face of the wafer 10 and out through the outlet tube 26.

Although the wafer 10 may be formed of any material which is permeable to the material to be contained in the receptacle 34, in a preferred embodiment of the said Martin invention a fluorinated ethylene propylene resin sold typically under the trademark "FEP TEFLON" by E.I. DuPont deNemours & Company may be used. Other most suitable materials are the fluorinated and chlorinated ethylene polymers, the latter being sold under the trademark "KEL–F" or polyethylene or some of the polyamides such as those sold typically under the trademark "NYLON." The thickness of the wafer 10 may be varied to vary the range of permeation rates that may be had by varying the temperature of the system.

In accordance with another embodiment of the said Martin invention, holes 50 may be formed in either of the end portions of the wafer 10. This permits the wafer 10 to be slipped radially with respect to the main body 12 until one of the holes 50 is aligned with the port 20. This facilitates filling the receptacle through the inlet tube 30 to the receptacle. For this purpose, the receptacle 34 may be placed in a cooled reservoir such that gaseous material is in effect distilled into the receptacle 34. This method is particularly useful if the lower level material has a boiling point below room temperature, if it reacts with air, or if it is toxic or noxious to work with, or if it is desired to evacuate the receptacle 34 before filling. After the filling is complete, the wafer 10 is then slid in such a direction as to remove the hole 50 from the mouth of the reservoir so as to leave only a solid material of the wafer covering the end of the receptacle as well as the port 20 for permeation and sealing. The radial movements of the wafer 10 are illustrated by the phantom representations of FIG. 4.

In accordance with the invention which is the subject of this divisional application, the gas mixing apparatus illustrated in FIGS. 1–4 may be inserted directly into the bore or cavity 60 of a heated chamber or oven 62 which may be seen most clearly in FIGS. 5–7. The oven itself is shown only in phantom. By varying the temperature of the oven 62, the permeation rate through the disc may be varied in a known manner. Further, to provide a complete range of dilutions, the oven 62 is provided with a top or header 64 having tubing connectors 66 adapted to engage the tubes 26 and 30 of the permeation wafer assembly of FIGS. 1–4. Alternatively, the header 64 is provided with suitable fittings for mounting a sealed flow-through chamber 63 capable of housing permeation or diffusion tubes when higher levels of the minor component in the gas mixture are desired. In either event, the tubular flow-through chamber 63 is adapted to fit within the cavity 60 of the oven 62 and to be sealed at either end in accordance with another embodiment of the said Martin invention.

In accordance with this last named embodiment, the header 64 for the oven cavity is provided with conventional tubing connector bulkhead-type fittings 66 of the type sold by Crawford Fitting Company under the trademark "SWAGELOK." Such bulkhead fittings 66 provided with suitable retaining nuts 68 are fitted through the rectangular plate forming the header 64. A tube 70 may be coupled to the one end of the bulkhead fitting 66 using a conventional cap nut 72 together with the usual ferrules 73 common to tubing connectors. The other end of the bulkhead fitting 66 is coupled to the tubular chamber 63 in a novel manner in accordance with the said Martin invention.

Specifically, an outer sleeve 75 provided with internal threads at one end and flanged as at 76 at the same end, is adapted to threadedly engage the threads 78 of the inner portion of the bulkhead fitting 66 of the tubing connector. In like manner, a tubing stub 80 is fitted with the conventional ferrules 73 utilized with such tubing connectors and an inner sleeve 84 having a flanged end 86 and a bore 88 therein sized to accomodate the tubing stub 80, has its interior portion threaded to engage the bulkhead fitting 66. Thus, when both the inner and outer sleeves 75 and 84 are threaded on the bulkhead fitting the tubing stub 80 is secured utilizing the conventional swaged seal. If now the outer sleeve 75 is backed off, the bulkhead fitting the O-ring 79 positioned against the flange 86 becomes compressed and expands until it engages the inner wall of the tubular chamber 63 thereby providing a chamber seal. The outer sleeve flange 76 is accessible from the exterior of the chamber 63.

A hitch-type flexible linkage 94 may be provided to retain the tubular chamber 63 in position and to prevent undue strain upon the O-ring seal. Thus, any suitable linkage 94 may have a U-shaped end portion 96 which engages a hooked member 98 which may be formed on the external wall part of the tubular chamber 63 during its formation. The linkage, which alternatively may be a spring, is secured to the header 64 and is illustrated as a bolt engaged through the header with a threaded bore in a barrel nut to which a sling 96 is attached. The sling 96 engages the hooked member 98.

At the lower portion of the chamber 63 there is located an entrance passage or tube 99 which allows the incoming gas to be preheated and for the sake of compactness encircles the chamber 63 and finally is adapted to pass through the second bulkhead fitting 66 mounted in the header 64. A seal at this point may be provided about the tube 99 by an O-ring 100 positioned within a cap nut 102 of the connector. An external entrance tube 104 is secured to the bulkhead fitting used by the elements 72, 73.

With this arrangement, gas to be diluted is passed in through inlet tube 104, flowed over a permeation or diffusion tube in the chamber 63, and out through the exit tube 70. The header 64 may be used as noted either with the permeation wafer assembly of FIGS. 1–4 or the closed chamber 63 of FIGS. 5 and 6 as desired. The chamber 63 is easily mounted and sealed simply by adjusting the outer sleeve 75 to compress the O-ring 79. Demounting is equally facilitated by reversing the process. Cap nut 102 engages or releases the entrance tube 99.

The advantages of this invention are many. The oven header includes fittings which permit the rapid removal and replacement of the various gas mixing devices whether they be permeation tubes or wafers or diffusion tubes. This permits all ranges of gas dilution apparatus to be utilized in conjunction with a temperature controlled oven as is necessary and desirable to control the various flow rates. Utilizing the sealed oven arrangement of this invention a highly versatile gas dilution apparatus with reduced oven dimensions is available.

It is obvious that many embodiments may be made of this inventive concept, and that many modifications may be made in the embodiments hereinbefore described. Therefore, it is to be understood that all descriptive material herein is to be interpreted merely as illustrative, exemplary, and not in a limited sense. It is intended that various modifications which might readily suggest themselves to those skilled in the art be covered by the following claims, as far as the prior art permits.

What is claimed is:

1. A gas flow apparatus adapted to provide a conduit for the flow of a first gas comprising:
    a hollow cylindrical chamber adapted to contain a permeation tube or a diffusion tube containing a second gas,
    seal means connecting one end of said chamber to said tubing means,
    said seal means including an externally threaded tubing connector connected to said tubing means,
    inner and outer annularly disposed sleeve means threadedly engaged with said tubing connector, and fitting within one end of said chamber,
    said inner sleeve means having an outer flange of diameter sufficient to retain and compress a seal ring to engage the inner wall of one end of said chamber, and
    said seal ring being disposed adjacent one side of said flange and said outer sleeve, whereby counter-rotation of each of said sleeve means causes said seal ring to be released by the axial movement of said sleeve means between said flange and said outer sleeve means to disengage from the inner wall of said chamber.

2. An apparatus according to claim 1 wherein said inner sleeve means has an axial bore thereby to receive a length of tubing and function as a cap nut therefor to connect said length of tubing to said threaded tubing connector.

3. An apparatus according to claim 1 which also includes fastening means for securing said chamber axially to said connector.

4. An apparatus according to claim 1 which also includes oven means enclosing said chamber for heating said gas flow apparatus.

* * * * *

UNITED STATES PATENT OFFICE
CERTIFICATE OF CORRECTION

Patent No. 3,689,038            Dated September 5, 1972

Inventor(s) Aaron J. Martin

It is certified that error appears in the above-identified patent and that said Letters Patent are hereby corrected as shown below:

Column 1, lines 35-36    Change "impossible" to ---possible---.

Column 2, line 9    Change "in" to ---to---.

Column 4, line 19    Change "wafter" to ---wafer---.

Signed and sealed this 23rd day of January 1973.

(SEAL)
Attest:

EDWARD M. FLETCHER, JR.            ROBERT GOTTSCHALK
Attesting Officer            Commissioner of Patents